(12) United States Patent
Quinio et al.

(10) Patent No.: US 12,337,762 B2
(45) Date of Patent: Jun. 24, 2025

(54) METHOD AND DEVICE FOR ADJUSTING COMFORT AND/OR SAFETY FUNCTIONS OF A VEHICLE

(71) Applicant: PSA AUTOMOBILES SA, Poissy (FR)

(72) Inventors: Pierre Quinio, Versailles (FR); Loic Bayard, Les Ulis (FR); Eric Eledut, Chatenay Malabry (FR); Charles Moreau, Rambouillet (FR); Maxime Savignac, Versailles (FR)

(73) Assignee: PSA AUTOMOBILES SA, Poissy (FR)

( * ) Notice: Subject to any disclaimer, the term of this patent is extended or adjusted under 35 U.S.C. 154(b) by 196 days.

(21) Appl. No.: 18/007,681

(22) PCT Filed: May 3, 2021

(86) PCT No.: PCT/FR2021/050760
§ 371 (c)(1),
(2) Date: Dec. 1, 2022

(87) PCT Pub. No.: WO2021/255354
PCT Pub. Date: Dec. 23, 2021

(65) Prior Publication Data
US 2023/0242039 A1    Aug. 3, 2023

(30) Foreign Application Priority Data

Jun. 15, 2020    (FR) ......................................... 2006213

(51) Int. Cl.
*B60R 1/26*     (2022.01)
*H04N 5/272*    (2006.01)
(Continued)

(52) U.S. Cl.
CPC ............... *B60R 1/26* (2022.01); *H04N 5/272* (2013.01); *B60K 35/00* (2013.01); *B60K 35/10* (2024.01);
(Continued)

(58) Field of Classification Search
CPC . B60R 1/26; B60R 2300/8046; B60R 16/037; H04N 5/272; B60K 35/00;
(Continued)

(56) References Cited

U.S. PATENT DOCUMENTS 7,126,583 B1 * 10/2006 Breed .................... B60K 35/29
                                                    345/173
9,308,864 B2 * 4/2016 Cho .......................... B60R 1/27
(Continued)

FOREIGN PATENT DOCUMENTS

DE    102012004640 A1 *  9/2013 ............. B60K 35/00
DE    102012004793 A1    9/2013
(Continued)

OTHER PUBLICATIONS

DE-102012004640-A1 machine translation (Year: 2012).*
(Continued)

*Primary Examiner* — Angelina M Shudy
(74) *Attorney, Agent, or Firm* — Sandberg Phoenix & von Gontard P.C.

(57) ABSTRACT

The invention relates to a method for setting functions of a vehicle that includes system of digital rear-view mirrors comprising at least one camera (102, 103) capturing images from outside the vehicle, a first touch screen (104) placed on the driver's side, dedicated to displaying the outside environment on the driver's side, a second touch screen (105) placed on the passenger's side, dedicated to displaying the outside environment on the passenger's side, and a computer processing images captured by said camera and displaying
(Continued)

them on said screens (104, 105). The method comprises a step of displaying, on one of the touch screens (104, 105), functional settings of the system of digital rear-view mirrors in response to detecting a first command, characterized in that it further comprises a step of displaying comfort and/or safety function settings of the vehicle in response to detecting a second command.

10 Claims, 4 Drawing Sheets

(51) Int. Cl.
*B60K 35/00* (2006.01)
*B60K 35/10* (2024.01)
*B60K 35/28* (2024.01)
*B60K 35/29* (2024.01)

(52) U.S. Cl.
CPC .............. *B60K 35/28* (2024.01); *B60K 35/29* (2024.01); *B60K 2360/119* (2024.01); *B60K 2360/1438* (2024.01); *B60K 2360/176* (2024.01); *B60K 2360/1868* (2024.01); *B60R 2300/8046* (2013.01)

(58) Field of Classification Search
CPC ........ B60K 35/10; B60K 35/28; B60K 35/29; B60K 2360/119; B60K 2360/1438; B60K 2360/176; B60K 2360/1868; B60K 35/60; B60K 2360/1876; B60K 2360/27; B60K 35/22; B60K 2360/1442; B60K 2360/1523; B60K 2360/178; B60K 2360/21; B60K 2360/779; B60K 2300/8046
See application file for complete search history.

(56) References Cited

U.S. PATENT DOCUMENTS

| | | | | |
|---|---|---|---|---|
| 9,348,492 | B1* | 5/2016 | Penilla | H04L 63/083 |
| 9,446,712 | B2* | 9/2016 | Heinemann | B60R 1/26 |
| 9,460,575 | B2* | 10/2016 | Park | G06F 21/32 |
| 10,618,469 | B2* | 4/2020 | Hussler | B60R 1/26 |
| 11,072,311 | B2* | 7/2021 | Luchner | G07C 9/25 |
| 11,498,494 | B2* | 11/2022 | Lynam | G08G 1/168 |
| 11,878,588 | B2* | 1/2024 | Moreau | B60K 35/22 |
| 2004/0150674 | A1* | 8/2004 | Takahashi | B60K 35/00 |
| | | | | 715/810 |
| 2008/0077882 | A1* | 3/2008 | Kramer | G06V 40/28 |
| | | | | 715/810 |
| 2008/0192024 | A1* | 8/2008 | Mita | G06F 3/044 |
| | | | | 345/173 |
| 2012/0224060 | A1* | 9/2012 | Gurevich | G01C 21/365 |
| | | | | 348/148 |
| 2012/0283894 | A1* | 11/2012 | Naboulsi | A61B 5/18 |
| | | | | 701/1 |
| 2013/0106995 | A1* | 5/2013 | Jeon | G06F 3/0304 |
| | | | | 348/43 |
| 2014/0303842 | A1* | 10/2014 | Boelter | B60K 1/04 |
| | | | | 701/36 |
| 2015/0042803 | A1* | 2/2015 | Heinemann | B60R 1/26 |
| | | | | 348/148 |
| 2015/0081167 | A1* | 3/2015 | Pisz | B60K 37/00 |
| | | | | 715/771 |
| 2015/0161836 | A1* | 6/2015 | Park | G06F 21/36 |
| | | | | 340/5.51 |
| 2015/0192424 | A1* | 7/2015 | Kuo | G01C 21/367 |
| | | | | 701/454 |
| 2015/0202962 | A1* | 7/2015 | Habashima | G06T 19/006 |
| | | | | 345/633 |
| 2015/0291032 | A1* | 10/2015 | Kim | B62D 1/04 |
| | | | | 280/779 |
| 2016/0364111 | A1* | 12/2016 | Piekny | G06F 3/0488 |
| 2017/0043719 | A1* | 2/2017 | Wippler | B60R 1/26 |
| 2017/0249718 | A1* | 8/2017 | Wunderlich | B60W 50/10 |
| 2018/0081614 | A1* | 3/2018 | Tsai | B60K 35/10 |
| 2018/0134217 | A1* | 5/2018 | Peterson | G06V 20/58 |
| 2018/0312114 | A1* | 11/2018 | Inoue | B60R 1/23 |
| 2018/0370436 | A1* | 12/2018 | Hussler | B60R 1/26 |
| 2019/0071055 | A1* | 3/2019 | Luchner | H04L 63/0861 |
| 2019/0248378 | A1* | 8/2019 | Nix | G05D 1/0077 |
| 2019/0375409 | A1* | 12/2019 | Hunt | G01C 21/36 |
| 2020/0167114 | A1* | 5/2020 | Hayashida | G06F 3/14 |
| 2020/0182652 | A1* | 6/2020 | Cruz | H04W 4/021 |
| 2020/0401818 | A1* | 12/2020 | Gibert Castroverde | |
| | | | | B60K 35/22 |
| 2021/0149397 | A1* | 5/2021 | Shin | G06V 20/56 |
| 2021/0155167 | A1* | 5/2021 | Lynam | B62D 15/028 |
| 2021/0309182 | A1* | 10/2021 | Ragunathan | G06V 40/166 |
| 2022/0083794 | A1* | 3/2022 | Bronte | B60R 11/04 |
| 2022/0089029 | A1* | 3/2022 | Fouquereau | B60K 35/10 |
| 2022/0144085 | A1* | 5/2022 | Lian | F16M 13/02 |
| 2023/0211663 | A1* | 7/2023 | Moreau | B60K 35/22 |
| | | | | 701/36 |
| 2024/0013600 | A1* | 1/2024 | Jung | B60R 25/01 |
| 2024/0064274 | A1* | 2/2024 | Blank | B60R 1/25 |

FOREIGN PATENT DOCUMENTS

EP 2822814 A1 1/2015
KR 101542502 B1 * 8/2015

OTHER PUBLICATIONS

KR-101542502-B1 machine translation (Year: 2015).*
International Search Report for PCT/FR2021/050760 mailed Aug. 23, 2021.
Written Opinion for PCT/FR2021/050760 mailed Aug. 23, 2021.

* cited by examiner

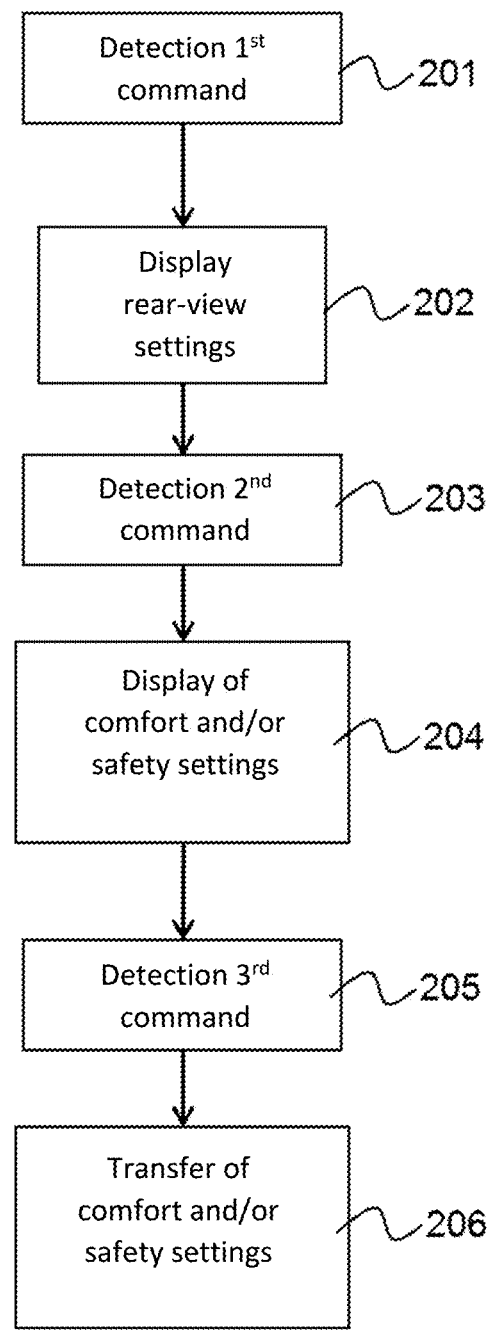

[Fig. 3]
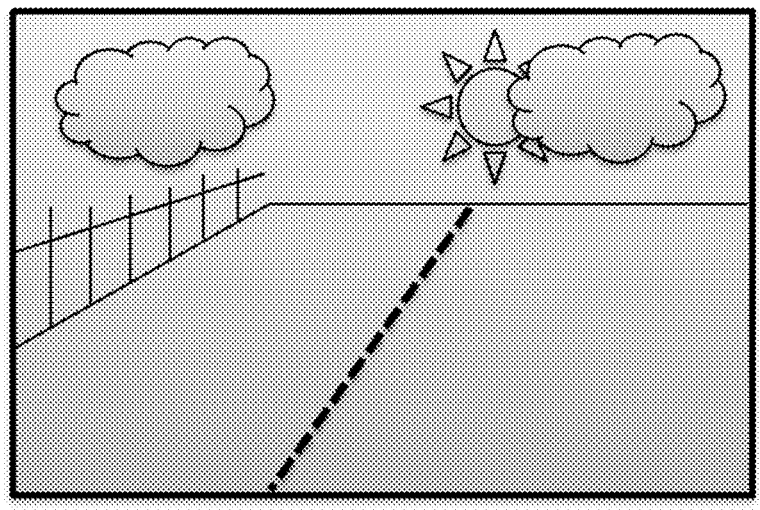
[Fig. 4]
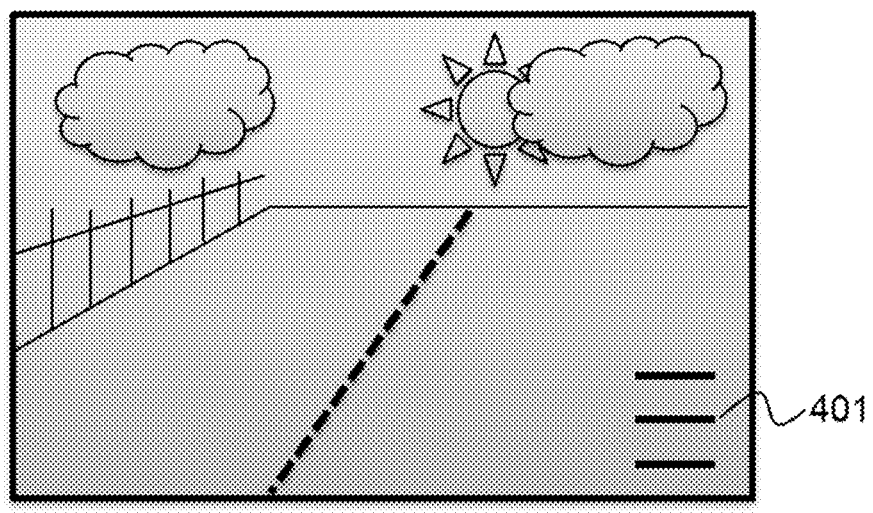

[Fig. 5]
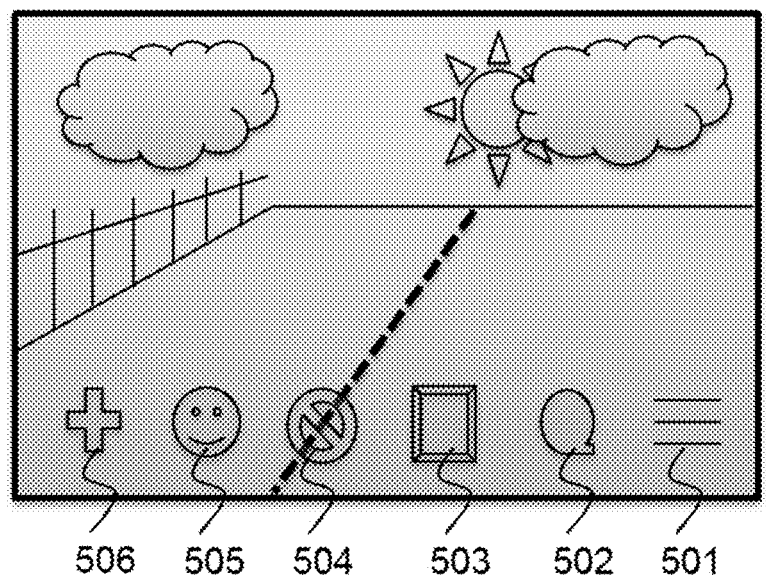

METHOD AND DEVICE FOR ADJUSTING COMFORT AND/OR SAFETY FUNCTIONS OF A VEHICLE

CROSS-REFERENCE TO RELATED APPLICATIONS

This application is the US National Stage under 35 USC § 371 of International Application No. PCT/FR2021/050760, filed 3 May 2021 which claims the priority of French application 2006213 filed on 15 Jun. 2020, the content (text, drawings and claims) of both said applications being incorporated herein by way of reference.

BACKGROUND

Disclosed herein is man-machine interface for a vehicle, and more particularly a method for setting comfort and/or safety functions of the vehicle.

It is known to equip a motor vehicle with one or more digital rear-view mirrors comprising a screen displaying images of the outside environment captured by cameras. These devices are beginning to replace the traditional reflective rear-view mirrors placed on either side of the front, left and right doors.

EP Pat. No. 2 822 814 describes a vehicle comprising a digital rearview mirror, in particular an exterior and/or side rear-view mirror, that comprises at least one touch screen which displays images captured by a camera positioned outside the vehicle. A representation parameter of the display device, in particular the brightness and/or the contrast and/or a color parameter of the display device, can be set on the touch screen.

These new functional settings dedicated to digital rear-view mirrors are in addition to the other functional settings of the vehicle that already exist. This therefore leads to an additional user interaction interface. This multiplicity of interfaces contributes to the increase in vehicle manufacturing costs by adding numerous components (buttons, wiring, etc.). This multiplicity also contributes to the complexity of use for users.

SUMMARY

Disclosed is a solution for simplifying access to vehicle functional settings while reducing the manufacturing cost of the vehicle.

More precisely, to this end, a method is disclosed for setting vehicle functions, said vehicle comprising a driver's side and a passenger's side, said vehicle comprising a system of digital rear-view mirrors.

The digital rear-view mirror system comprises at least one camera 102, 103 capturing images from outside the vehicle, a first touch screen 104 placed on the driver's side dedicated to displaying the outside environment on the driver's side, a second touch screen 105 placed on the passenger's side dedicated to displaying the outside environment on the passenger's side, and a computer 106 adapted for processing images captured by said camera 102, 103 and displaying the images on said screens 104, 105.

The method is implemented by said computer 106 and comprises a step 202 of displaying, on one of the touch screens 104, 105, the functional setting of the digital rear-view mirror system in response to the detection 201 of a first command. The method further comprises a step 204 of displaying the comfort and/or safety function settings of the vehicle in response to the detection 203 of a second command.

Thus, the digital rear-view mirror system is enhanced with additional settings, in particular comfort and/or safety function settings. This makes it possible, for example, to at least partially remove setting buttons, which has the effect of reducing the cost of these comfort and/or safety functions.

The method allows the passenger to have easier access to functional settings.

Advantageously, the method further comprises a step of determining a phase of life of the vehicle from vehicle data, wherein the display of comfort and/or safety function settings of the vehicle depends on the determined phase of life.

Thus, in certain vehicle life situations, access to certain comfort and/or safety function settings is not possible, allowing priority to be given to the display of the outside environment.

Advantageously, the vehicle data includes the speed of the vehicle; and if the determined phase of life is associated with a speed of the vehicle greater than a threshold, then the display of comfort and/or safety function settings is inhibited at least in part.

Thus, in the driving phase, for example, the setting corresponding to opening the trunk or a door is not displayed, which improves safety.

Advantageously, the method is characterized in that the display on the second touch screen 105 for setting comfort and/or safety functions of the vehicle is different from the display on the first touch screen 104.

Thus, for example, on the passenger's side, only the comfort and/or safety functions relating to the passenger's side are offered. This has the effect of improving ergonomics. This makes it possible to display only the useful or necessary settings on each screen.

Advantageously, the method further comprises a step 205 of detecting a third command selecting a comfort and/or safety function setting, and a step 206 of transferring the selected setting to equipment implementing the comfort and/or safety function setting.

Thus, the driver and/or the passenger can interact and set the actions of comfort and/or safety functions of the vehicle from a touch screen of the system of digital rear-view mirrors for the driver and/or the passenger.

Advantageously, the method further comprises authentication of the driver and/or passenger.

This allows for the access to comfort and/or safety function settings to be authorized only for certain people. For example, the deactivation of the passenger airbag can only be done by an authenticated adult.

Advantageously, the method is characterized in that the display of comfort and/or safety function settings of the vehicle is superimposed with respect to the display of the outside environment.

Thus, the driver can continue to see what is happening outside the vehicle.

Also disclosed is a digital rear-view mirror system comprising at least one camera 102, 103 capturing images from outside the vehicle, a first touch screen 104 placed on the driver's side dedicated to displaying the outside environment on the driver's side, a second touch screen 105 placed on the passenger's side dedicated to displaying the outside environment on the passenger's side, and a computer 106 adapted for processing images captured by said camera 102, 103, for displaying the images on said screens, and for implementing the method described above for setting vehicle functions.

A vehicle comprises a device that carries out the method.

Lastly a computer program comprising instructions suitable for executing the steps of the method described above for setting functions, when said program is executed by at least one processor.

DESCRIPTION OF THE FIGURES

Other features and advantages of the method will emerge from the description of the non-limiting embodiments thereof set forth below, with reference to the appended figures, in which:

FIG. 2 schematically illustrates a method for setting vehicle functions.

FIG. 3 schematically illustrates a first example of the display of a screen of the system of digital rear-view mirrors.

FIG. 4 schematically illustrates a second example of the display of a screen of the system of digital rear-view mirrors.

FIG. 5 schematically illustrates a third example of the display of a screen of the system of digital rear-view mirrors.

DETAILED DESCRIPTION

Figure 1:
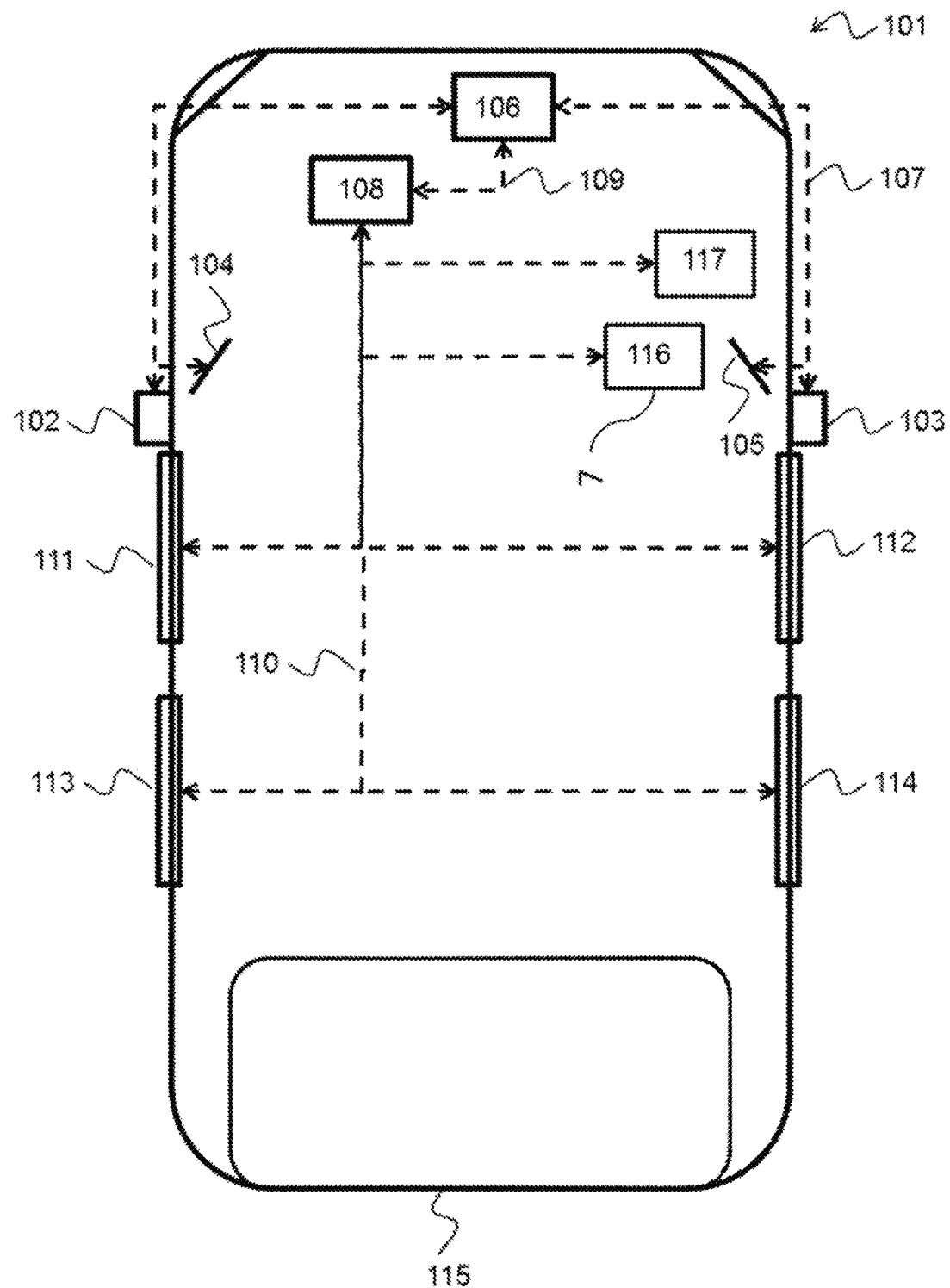
FIG. 1 schematically illustrates a vehicle comprising a digital rear-view mirror device.

FIG. 1 shows a vehicle 101 comprising a digital rear-view mirror system. The vehicle comprises a driver's side and a passenger's side. The digital rear-view mirror system comprises at least one camera 102, 103 which captures images from outside the vehicle, a first touch screen 104 placed on the driver's side, a second touch screen 105 placed on the passenger's side, and a computer 106. A communication channel 107, for example a CAN network, connects these components.

In the embodiment of FIG. 1, the vehicle comprises a first camera 102, on the driver's side, and a second camera 103 on the passenger's side.

In another embodiment, not illustrated, the vehicle comprises a single camera that is advantageously placed on the roof, making it possible to capture images of the environment outside the vehicle.

FIG. 3 shows a view of the driver's side touch screen in the absence of a command.

The computer 106 can also be connected to a second computer 108 using a second communication channel 109. The second computer 108, using a third communication channel 110, can be connected to devices controlling comfort and/or safety functions.

Setting comfort and/or safety functions allows a user, for example, to open or close
- an opening (such as a door or a window 111, 112, 113, 114, a trunk 115, or a hood, etc.)
- storage 116, 117 (such as a glove box in the armrest, the doors, etc., or on the central console, etc.).

This also makes it possible to choose whether or not to lock the state of an opening (for example prohibiting a child from opening their door, their window, etc.), storage, or a functionality such as starting the vehicle, airbag, access to personal data, tunnel carwash mode, child lock, air conditioning, etc. In addition, it also makes it possible to set a feature such as ventilation and air conditioning temperature, or the sound environment.

The computer 106 implements the method, a flowchart of which is shown in FIG. 2. Advantageously, this method comprises a first step 201 of detecting a first command resulting from pressing one of the touch screens 104, 105.

In response to this detection, the computer, at step 202, displays the settings relating to the digital rear-view mirror system on one of the touch screens 104, 105.

Following detection of a second command at step 203, the computer, at step 204, makes it possible to display the settings concerning the comfort and/or safety functions. The detection of the second command can be performed from a press on the touch screen by a user.

According to a first embodiment, this pressing can be done by a single finger on the screen or on a particular region, such as, for example, on an icon 401 as illustrated, for example, in FIG. 4. This pressing can also be done multiple times. This area or icon pressed can be a diagram or drawing.

According to a second embodiment illustrated in FIG. 5, access to the settings is done using icons 501, 502, 503, 504, 505, 506. The access can also be done using a display of text, menus and sub-menus, a scroll bar, a check box or the like.

Preferably, the outside view captured by the at least one camera 102, 103 will not be entirely replaced. The information is displayed as a watermark, in transparency or on the periphery of the screen so as not to interfere with rear vision. Thus, the image captured by the camera remains visible.

The detection of a third command at step 205 makes it possible to identify a comfort and/or safety function setting. This setting is then transferred by the computer 106 via a communication channel to a second computer 108, thus making it possible to carry out the setting of the comfort and/or safety function.

Advantageously, the method further comprises a step of determining a life phase of the vehicle from vehicle data. The computer 106 can either retrieve data from the vehicle transiting on the communication channel 109, or request data by a particular CAN request from the computer 108. The engine speed, data representative of vehicle dynamics such as vehicle speed, direction of travel, selected driving mode, active ADAS functions, steering wheel angle, ignition key position (+APC), the presence of a driver or passenger, location, information related to the state of charge and/or health of a battery, information available in supervisors such as the BMS battery supervisor), etc. may be data recovered by the computer 106.

The computer 106 can then determine a life phase of the vehicle, such as, for example: the vehicle is moving or has stopped; the engine is running or has stopped; the battery charging phases, the turn signal is activated or not; the driver is performing a maneuver such as turning the steering wheel; the vehicle is in autonomous mode or not; the vehicle is occupied or not; the openings (doors, windows, trunk, etc.) are open or closed; the vehicle is in diagnostic mode; etc.

The display of vehicle comfort and/or safety function settings depends on the determined life phase; in other words, depending on the determined life phase, following step 203, the computer 106 displays a subset of settings. For example, if the vehicle is stationary and the engine is running, all of the settings can be displayed, such as opening of the doors and/or the trunk. Conversely, if the vehicle is moving, access to opening the doors and/or the trunk is no longer displayed or is inhibited.

Advantageously, the display of the comfort and/or safety function settings is different between the driver's side and the passenger's side. On the driver's side, all the functionalities can be presented. On the passenger's side, only functions unrelated to driving or the driver's position are displayed, such as opening the passenger window, for example.

Following the display of the comfort and/or safety function settings, the user can set a function such as opening the window, for example. The window opening order is then transmitted via the available communication channels 107, 109, 110 to the door computer to perform the action.

Advantageously, the method further comprises a step of authenticating the driver and/or the passenger. Indeed, access to the setting of certain functions may require an authentication step in order, for example, to identify the owner of the vehicle and/or of an authorized occupant. The authentication step can be performed on the touch screen 104 or 105 by drawing a diagram, by entering a code, by repeatedly pressing the screen according to a predefined sequence, by fingerprint recognition, etc. Following authentication, it is possible, for example, to open the glove box, the trunk or storage, to start the vehicle, etc.

The invention claimed is:

1. A method for setting functions of a vehicle, said vehicle comprising a driver's side and a passenger's side and a system of digital rear-view mirrors, said vehicle further comprising
   at least one camera capturing images from outside the vehicle, a first touch screen placed on the driver's side dedicated to displaying an outside environment on the driver's side,
   a second touch screen placed on the passenger's side dedicated to displaying the outside environment on the passenger's side,
   a computer adapted to process images captured by said at least one camera and to display said images of the outside environment on said first and second touch screens,
said method being implemented by said computer and comprising:
   detecting a first command indicative of one of said first and second touch screens being pressed;
   displaying on one of the first touch screen and the second touch screen a functional setting of the digital rear-view mirror system in response to the detection of said first command, and
   detecting a second command indicative of said one of said first and second touch screens being pressed, and
   displaying on one of the first and second touch screens a functional setting of the digital rear-view mirror system in response to the detection of a first command, and
   displaying comfort and/or safety function settings of the vehicle in response to the detection of said second command.

2. The method for setting functions according to claim 1, wherein the method further comprises a step of determining a phase of life of the vehicle from vehicle data, said vehicle data comprising one or more of the following: engine speed, vehicle speed, direction of travel, selected driving mode, active ADAS functions, steering wheel angle, ignition key position, (+APC), a presence of a driver or passenger, location information, information related to a state of charge and/or health of a battery, the first computer displaying on said one of said first and second touch screens a subset of the comfort and/or safety function settings of the vehicle, the subset of setting displayed by the first computer being a function of the determined phase of life of the vehicle.

3. The method for setting functions according to claim 2, wherein the vehicle is the vehicle speed; and the first computer displays said subset of comfort and/or safety function settings when it is determined that the vehicle speed is greater than a threshold speed.

4. The method for setting functions according to claim 1, wherein fewer of the comfort and/or safety function settings are displayed on the second touch screen than are displayed on the first touch screen.

5. The method for setting functions according to claim 1, wherein the method further comprises a step of detecting a third command indicative of comfort and/or safety function setting being selected, and a step of transferring the selected comfort and/or safety function setting to equipment implementing the comfort and/or safety function setting.

6. The method for setting functions according to claim 1, wherein the method further comprises a step of authenticating the driver and/or the passenger.

7. The method for setting functions according claim 1, wherein the step of displaying the comfort and/or safety function settings on said first touch screen and on said second touch screen comprises displaying the function settings of the vehicle superimposed over the display of the outside environment on said first touch screen and said second touch screen.

8. A digital rear-view mirror device, comprising
   the at least one camera adapted for capturing images from outside the vehicle, the first touch screen on the driver's side dedicated to displaying the outside environment on the driver's side,
   the second touch screen on the passenger's side dedicated to displaying the outside environment on the passenger's side,
   the computer adapted to process processing images captured by said at least one camera and to display said images on said screens,
   said computer being adapted to implement the method for setting functions of a vehicle according to claim 1.

9. A vehicle comprising the digital rear-view mirror device according to claim 8.

10. A method for setting functions of a vehicle, said vehicle comprising a driver's side and a passenger's side and a system of digital rear-view mirrors, said vehicle further comprising:
   at least one camera adapted to capture images from outside the vehicle, a first touch screen placed on the driver's side dedicated to displaying the images captured by said at least one camera of an outside environment on the driver's side,
   a second touch screen placed on the passenger's side dedicated to displaying the images captured by said at least one camera of the outside environment on the passenger's side,
   a first computer in communication with said at least one camera and said first and second touch screens;
   said first computer being adapted to process images captured by said at least one camera and to display said images on said first and second touch screens,
   a second computer in communication with said first computer;
   said second computer being adapted to control a set of safety and/or comfort settings of said vehicle;
   said method comprising:
   said first computer receiving a first command indicative of one of said first or second touch screens being pressed;
   said first computer, in response to said first command, displaying on said one of the first and second touch screens a functional setting of the digital rear-view mirror system,
   said first computer or second computer determining a phase of life of the vehicle from vehicle data, said vehicle data comprising one or more of the following:

engine speed, vehicle speed, direction of travel, selected driving mode, active ADAS functions, steering wheel angle, ignition key position (+APC), a presence of a driver or passenger, location information, information related to a state of charge and/or health of a battery, said first computer receiving a second command indicative of a selection of the functional setting at said one of the first and second touch screens;

said first computer, in response to detection of said second command, displaying on said one of said first and second touch screens a subset of comfort and/or safety function settings of the vehicle, wherein the subset of comfort and/or safety function settings of the vehicle displayed is a function of the determined phase of life, receiving a third command indicative of a selection of one of the comfort and/or safety function settings of the subset of displayed comfort and/or safety function settings;

said first computer transmitting to said second computer information regarding said selection; and said second computer implementing said selection.

* * * * *